US006634483B1

(12) United States Patent  
Longoria

(10) Patent No.: US 6,634,483 B1
(45) Date of Patent: Oct. 21, 2003

(54) TORTILLA STACK INDEXER

(75) Inventor: Jose L. Longoria, Plainview, TX (US)

(73) Assignee: ITE, Inc., Plainview, TX (US)

( * ) Notice: Subject to any disclaimer, the term of this patent is extended or adjusted under 35 U.S.C. 154(b) by 0 days.

(21) Appl. No.: 09/648,836

(22) Filed: Aug. 25, 2000

(51) Int. Cl.[7] .............................................. B65G 43/00
(52) U.S. Cl. ..................................... 198/357; 198/577
(58) Field of Search ............................... 198/357, 358, 198/575, 577, 370.1, 817

(56) References Cited

U.S. PATENT DOCUMENTS

| 1,916,532 A | * | 7/1933 | Roberts | 198/357 |
| 2,304,447 A | * | 12/1942 | Feusier | 198/357 |
| 3,522,942 A | * | 8/1970 | Hepp | 451/461 |
| 3,915,316 A | | 10/1975 | Pomara, Jr. | |
| 4,006,831 A | | 2/1977 | Jimenez | |
| 4,360,098 A | * | 11/1982 | Nordstrom | 198/346 |
| 4,419,955 A | * | 12/1983 | Baba | 100/196 |
| 4,530,632 A | | 7/1985 | Sela | |
| 4,572,353 A | * | 2/1986 | Felder | 198/577 |
| 4,760,777 A | | 8/1988 | Welsh | |
| 5,094,337 A | * | 3/1992 | van Veldhuisen et al. | 198/357 |
| 5,253,762 A | | 10/1993 | Duncan | |
| 5,494,398 A | | 2/1996 | Montemayor et al. | |
| 5,531,156 A | | 7/1996 | Brummett | |
| 5,601,397 A | | 2/1997 | Lopez et al. | |
| 5,720,593 A | | 2/1998 | Pleake | |
| 5,842,557 A | | 12/1998 | Montemayor et al. | |
| 6,053,695 A | | 4/2000 | Longoria et al. | |

* cited by examiner

Primary Examiner—Janice L. Krizek
(74) Attorney, Agent, or Firm—Daniel V. Thompson

(57) ABSTRACT

A tortilla stack indexer (10) having an exit conveyor (12) which has a exit conveyor motor (12A) engagably attached thereto. At least two transverse conveyors are in a side-by-side parallel configuration at a perpendicular position to the exit conveyor (12) positioned at a rear distal end adjacent thereto. Each of the at least two transverse conveyors includes a transverse conveyor roller positioned at front end. A stacker conveyor positioned adjacent to the front end of the at least two transverse conveyors having a stacker conveyor roller positioned at rear end. A drive interrupter is engagably positioned between the transverse conveyor roller and the stacker conveyor roller. An electric eye securely mounted under the least two transverse conveyors controls the drive interrupter to prevent collisions of stacks of tortillas on the exit conveyor.

3 Claims, 7 Drawing Sheets

TORTILLA STACK INDEXER

TECHNICAL FIELD

The present invention relates to a food handling apparatus. More particularly, the present invention relates to an improved device for indexing stacks of tortillas on conveying apparatus.

BACKGROUND ART

A significant problem in tortilla manufacturing is the transporting of finished stacks of tortillas from a counter-stacker to a further handling machine, such as a cutter or bagger. The general operation of a Tortilla Counter-Stacker can be understood from my U.S. Pat. No. 6,053,695, the disclosure of which is incorporated by reference. Stacks of tortillas exit a counter-stacker at unsynchronized, and somewhat irregular, time intervals, and in as many as six or more parallel rows on an exit conveyor. The parallel rows of stacks on the exit conveyor are converted to a single row by transition onto a laterally positioned conveyor. A problem is that occasionally the timing of the stacks will be such that two stacks collide. Thus there is a need for occasionally indexing the stacks to avoid collision.

Numerous innovations applicable to a tortilla stack indexer have been provided in the prior art that are described as follows. Even though these innovations may be suitable for the specific individual purposes to which they address, they differ from the present invention as hereinafter contrasted.

U.S. Pat. No. 4,760,777, Entitled, "Tortilla Stacker," invented by Richard S. Welsh, discloses an apparatus for stacking tortillas includes a loading unit in the form of a trough-like loading conveyor for transporting a series of dough members while forming a small depression in each of the dough members. A container in the form of an upright hollow cylinder having a retractable loading surface is positioned at the discharge end of the loading conveyor. The tortillas are stacked one-on-top-of-the-other on the retractable loading surface by the loading conveyor. A conveyor located beneath the container receives the stack of tortillas upon retraction of the loading surface. A counter on an inclined chute leading to the conveyor accurately counts the number of tortillas entering the container.

U.S. Pat. No. 4,006,831, Entitled, "Automatic Tortilla Counter and Stacker," invented by James A. Jimenez, discloses a method of stacking articles and an automatically controlled apparatus for successively receiving articles formed of rigid or semirigid sheet material such as cooked or partially cooked tortillas or similar food products. The device automatically forms orderly stacks of a predetermined number of articles, and then automatically carries them away for packaging each stack when completed.

U.S. Pat. No. 4,530,632, Entitled, "Stacking Apparatus for Flexible, Generally Planar Food Products, invented by Richard Sela, discloses an apparatus for counting and stacking food products such as tortillas. The tortillas are initially placed on an entry chute containing a large number of air outlets for creating a cushion of air to allow the tortilla to slide down the entry chute onto an incline conveyor belt. The conveyor belt is of an open mesh design, and it is supported on a belt support having a large number of air inlets which create a vacuum that maintains the tortilla in contact with the belt. The tortillas are carried by the belt down one end of the belt support and along the underside of the belt support with contact between the tortilla and belt being maintained by vacuum creating air inlets formed in the belt support. The air inlets terminate at a location on the underside of the belt support thereby allowing the tortillas to drop from the conveyor belt. The tortillas drop onto a stationary rack formed by rods which are interleaved with conveyor belts moving together as a unit. The conveyor belts are normally positioned beneath the upper surface of the rack. However, when a predetermined number of tortillas have been stacked, the belt is lifted thereby carrying the tortillas from the rack. The mechanism for lifting the belts is actuated by a counter which counts a predetermined number of tortillas passing past a counting station and delays actuating the belt lifting mechanism until the final tortilla has dropped onto the rack. The belts discharging the stacks of tortillas move in the direction opposite the direction that the tortillas are delivered to the rack in order to minimize the time required to remove the tortillas from the rack before an additional tortilla may be placed thereon.

U.S. Pat. No. 5,720,593, Entitled, "Apparatus and Method of Counting, Inspecting and Stacking Planar Food Products," invented by Todd B. Pleake, discloses an apparatus for counting, inspecting, and stacking flexible, generally planar food products such as tortillas, or the like. The apparatus has an inclined infeed conveyor with adjustable alignment guides thereon to adjust the lateral position of each tortilla as it moves to a transit conveyor. Sensors mounted on the transit conveyor count the tortillas and inspect the size and shape of the tortillas to detect any defective tortillas moving along the transit conveyor. At the end of the transit conveyor, an arcuate-shaped trajectory guide bends the tortilla into an arcuate shape as the tortilla leaves the trajectory guide and flies through a known flight trajectory to a stacking mechanism. The arcuate shape allows the leading edge of the tortilla to resist bending or folding. A rejection mechanism positioned between the end of the transit conveyor and the trajectory guide redirects any rejected tortillas detected by the sensors downward away from the trajectory guide. A stacking mechanism receives the tortillas at the end of the flight trajectory. A shaker shakes the stacking mechanism and jostles the stack of tortillas to form a tight, aligned stack. A movable stack plate supports the stack of tortillas in the stacking mechanism and moves downward incrementally as tortillas are stacked into the stacking mechanism so the flight trajectory of each tortilla is approximately the same. The stacking plate has a lowered position that deposits a stack of tortillas on a baseplate, and a stack removal device moves the stack of tortillas away from the stacking assembly to a discharge conveyor.

U.S. Pat. No. 5,253,762, Entitled, "Stacking, Counting and Sorting Device for Flexible, Planar Food Products," invented by Daryl G. Duncan, discloses a device for counting, inspecting, sorting, and stacking planar food products such as tortillas. The tortillas are sandwiched between a pair of conveyor belts moving at the same speed to a discharge location between a pair of rollers around which the respective conveyor belts extend. The speed of the tortillas causes them to be flung from between the rollers onto a discharge tray. A counter determines when a predetermined number of tortillas have been discharged onto the discharge tray. The counter then triggers an actuator to remove the tray from beneath the stack of tortillas, thereby allowing them to fall onto a discharge conveyor belt. The discharge conveyor belt is then moved an incremental distance. The tortillas passing through the device are scanned in order to detect defective tortillas. When a defective tortilla is found, one of the rollers at the discharge location is shifted, thereby altering the path of the tortillas flung from the conveyor belts at the discharge location onto a reject discharge conveyor belt.

U.S. Pat. No. 5,601,397, Entitled, "Apparatus for Counting and Stacking Tortillas," invented by Manuel Lopez and Rafael Lopez, discloses an apparatus having a series of conveyor belts for flattening and stacking a plurality of flexible, generally planar articles, such as tortillas. The apparatus includes a first conveyor belt extending along first end, upper, second end and lower surfaces of a belt support. The conveyor belt is adapted to move the planar articles placed on the upper surface of the belt support from the first end to the second end. A second conveyor belt is biased against the first belt at the second end of the belt support for applying compressive and lateral forces to the planar articles as they are moved along the second end of the belt support. A third conveyor belt is located beneath the first and second conveyor belts for receiving the planar articles from the first belt, forming stacks of them, and then discharging the stacked planar articles. Motor assemblies drive the first, second, and third conveyor belts.

U.S. Pat. No. 3,915,316, Entitled, "Counting and Stacking Apparatus," invented by Johnny B. Pomara, Jr., discloses apparatus for counting and stacking substantially flat articles, such tortillas, which includes a first belt type feed conveyor, a second belt type stacking conveyor intermeshing with a vertically movable stacking rack or fork, and a take-away conveyor. The articles are sequentially fed from a conventional conveyor from apparatus such as an oven to the feed conveyor beneath a counting switch. Each article is discharged from the feed conveyor in a stacked relationship to the stacking conveyor against the stacking rack. When the desired number of articles are stacked on the stacking conveyor against the rack, the rack rapidly retracts downwardly releasing the stack for discharge to the take-away conveyor. Between the time of discharge of each stack and the arrival of the first article for forming the next stack, the stacking rack returns upwardly to intermeshed relationship with the stacking conveyor for forming and holding the next stack.

U.S. Pat. No. 5,531,156, titled, Automatic Taco Machine," invented by Brummett, discloses an automatic taco machine can automatically make both soft and hard tacos. Storage compartments for soft tortillas and hard taco shells are mounted above a V-shaped conveyor. A soft tortilla is removable from a stack of tortillas by a vacuum pick-up head and is heated and is inserted between a pair of heated plates where it is compressed and heated. A pusher bar moves downwardly through slots in the heater plates to fold the tortilla and push it onto the conveyor. A hot food dispenser and a cold food dispenser dispense hot and cold food onto the tortilla as it is moved by the conveyor. A hard taco shell is removable from a stack of taco shells by a reciprocally mounted peeler which separates the bottom taco shell from the stack and supports the stack while the bottom taco shell drops to the conveyor. The conveyor moves the taco shell past the hot and cold food dispensers.

U.S. Pat. No. 5,494,398, titled, Unstacking Machine and Method," invented by Montemayor, et. al., discloses a device for unstacking thin, flat articles, particularly flexible articles, and especially tortillas, from a stack of the same, which includes means for repetitively picking up the topmost tortilla in a stack and conveying it to a moving belt where it is deposited individually and separately and moved to a further processing operation. The pick up means includes a rotating cylinder having holes in its surface through which suction acts on the tortillas, to temporarily hold them to the cylinder, and belts around and rotating with the cylinder which transfer the tortillas from the cylinder to the moving conveyor.

Numerous innovations for a tortilla stack indexer have been provided in the prior art that are adapted to be used. Even though these innovations may be suitable for the specific individual purposes to which they address, they would not be suitable for the purposes of the present invention as heretofore described.

SUMMARY OF THE INVENTION

This invention provides an improved tortilla stack indexer where stacks of tortillas are transitioned from multiple parallel rows on an exit conveyor to a single row on a transverse conveyor. The indexer includes electric eyes for sensing the leading edges of stacks. Drive interrupters beneath the exit conveyor stop stacks temporarily when the electric eyes sense a collision path between stacks.

Accordingly, it is an object of the present invention to provide a tortilla stack indexer having exit conveyor, transverse conveyors, stacker conveyor, electric eye, and drive interrupter.

More particularly, it is an object of the present invention to provide the transverse conveyors with a transverse conveyor roller.

In keeping with these objects, and with others which will become apparent hereinafter, one feature of the present invention resides, briefly stated, in a stacker conveyor with stacker conveyor roller.

When the drive interrupter is designed in accordance with the present invention, it has a drive interrupter top member, drive interrupter bottom member, drive interrupter actuator, drive arm, and drive interrupter roller.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10—tortilla stack indexer (10)
12—exit conveyor (12)
12A—exit conveyor motor (12A)
14A—first transverse conveyor (14A)
14B—second transverse conveyor (14B)
14C—third transverse conveyor (14C)
14D—fourth transverse conveyor (14D)
14E—fifth transverse conveyor (14E)
14F—sixth transverse conveyor (14F)
14G—seventh transverse conveyor (14G)
14H—eighth transverse conveyor (14H)
15A—first transverse conveyor roller (15A)
15B—second transverse conveyor roller (15B)
15C—third transverse conveyor roller (15C)
15D—fourth transverse conveyor roller (15D)
16A—first stacker conveyor (16A)
16AA—first stacker conveyor roller
16B—second stacker conveyor (16B)
16BA—second stacker conveyor roller
16C—third stacker conveyor (16C)
16CA—third stacker conveyor roller
16D—fourth stacker conveyor (16D)
16DA—fourth stacker conveyor roller (16DA)
18A—first electric eye (18A)
18B—first electric eye (18B)

18C—first electric eye (18C)
18D—first electric eye (18D)
20A—first drive interrupter (20A) (not shown)
20B—second drive interrupter (20B) (not shown)
20C—third drive interrupter (20C) (not shown)
20D—fourth drive interrupter (20D)
20DA—fourth drive interrupter housing (20DA)
20DB—fourth drive interrupter top member (20DB)
20DBA—fourth drive interrupter top member pivot pin (20DBA)
20DC—fourth drive interrupter bottom member (20DC)
20DCA—fourth drive interrupter bottom member pivot pin (20DCA)
20DD—fourth drive interrupter actuator (20DD)
20DDA—fourth drive interrupter actuator pivot pin (20DDA)
20DE—fourth drive arm (20DE)
20DEA—fourth drive arm pivot pin (20DEA)
20DF—fourth drive interrupter roller (20DF)

DESCRIPTION OF THE PREFERRED EMBODIMENT

Figure 1:
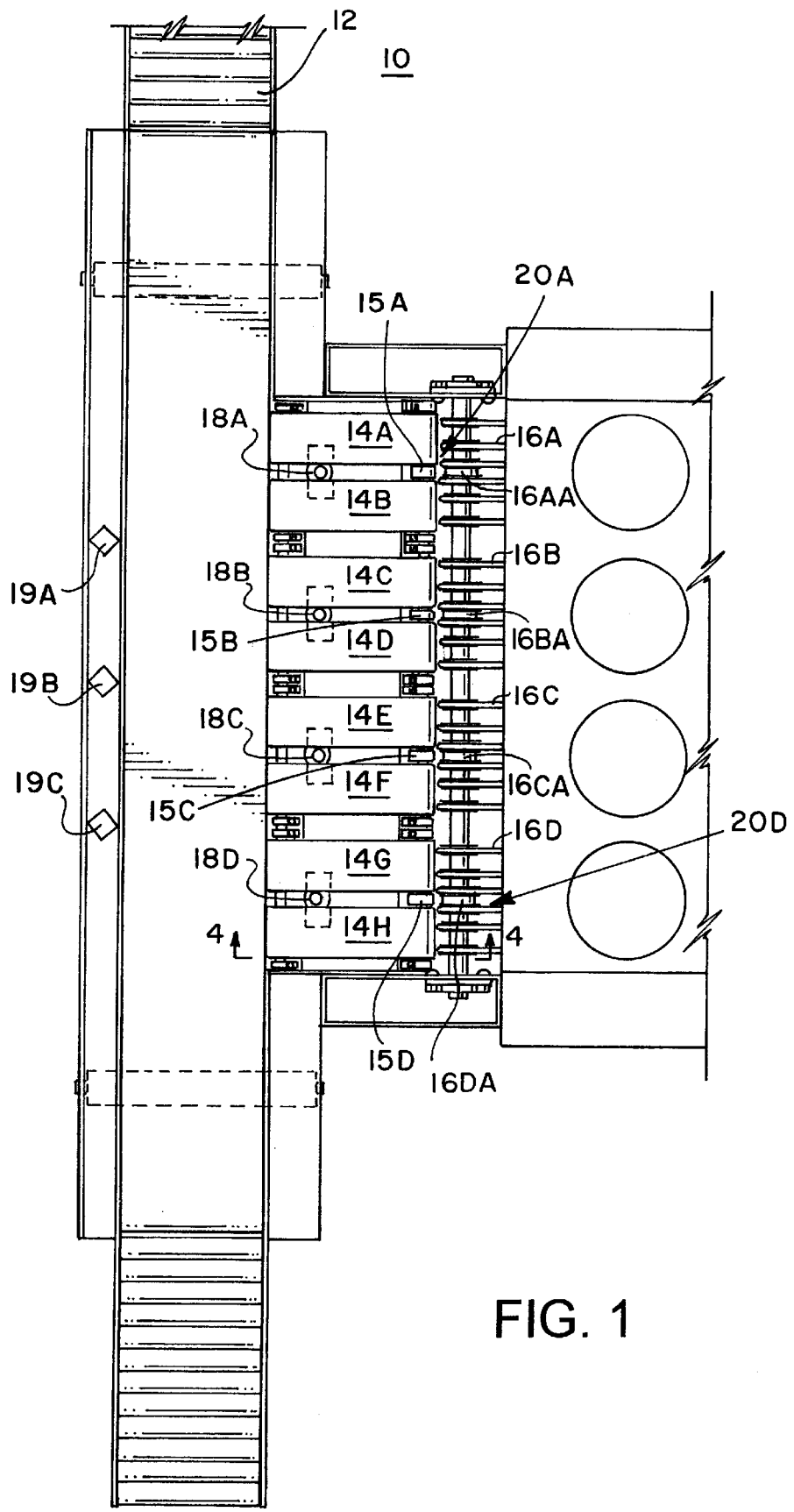
FIG. 1 is a top view of a tortilla stack indexer (10).
Figure 2:
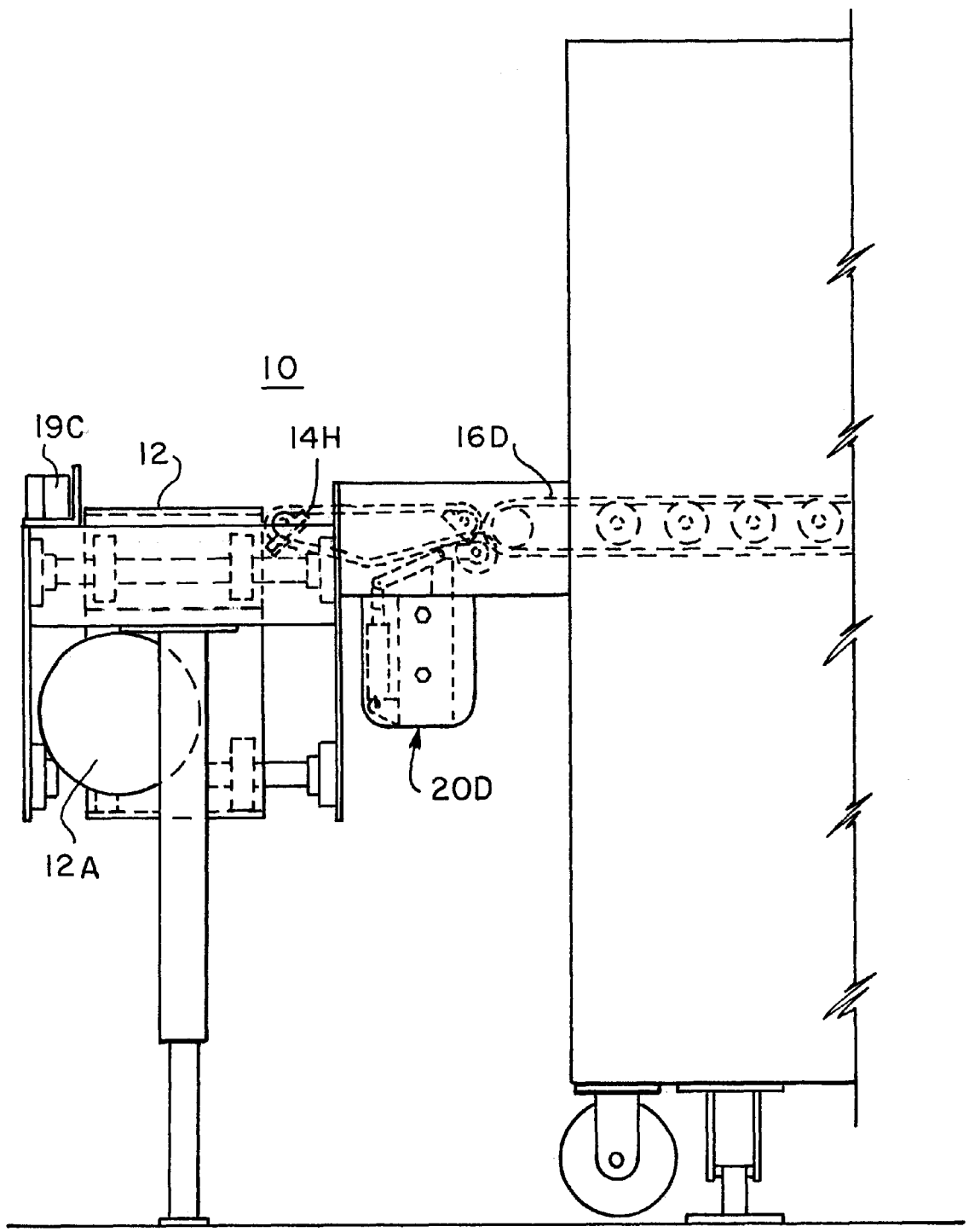
FIG. 2 is a right side view of a tortilla stack indexer (10).
Figure 3:
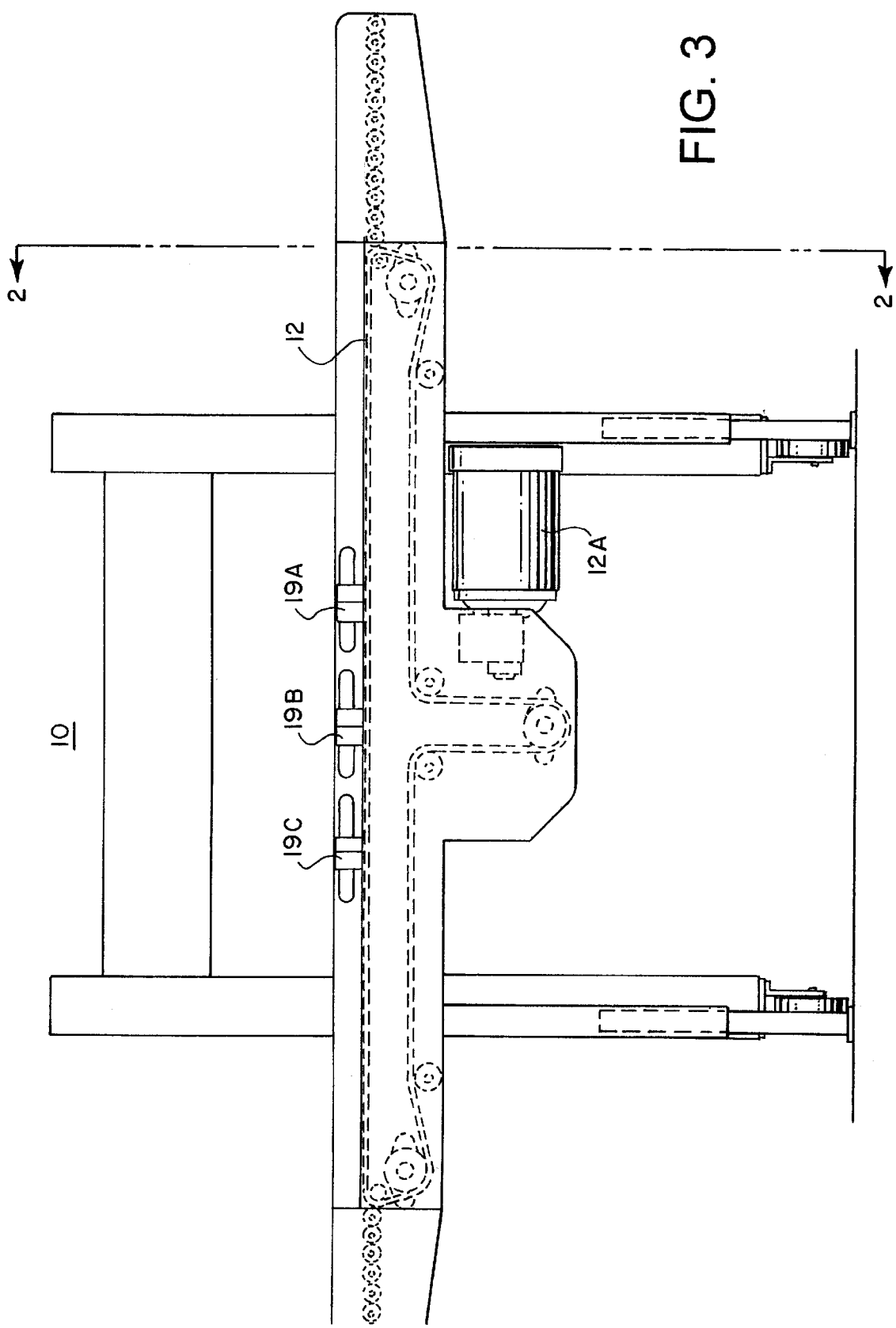
FIG. 3 is a front view of a tortilla stack indexer (10).
Figure 5:
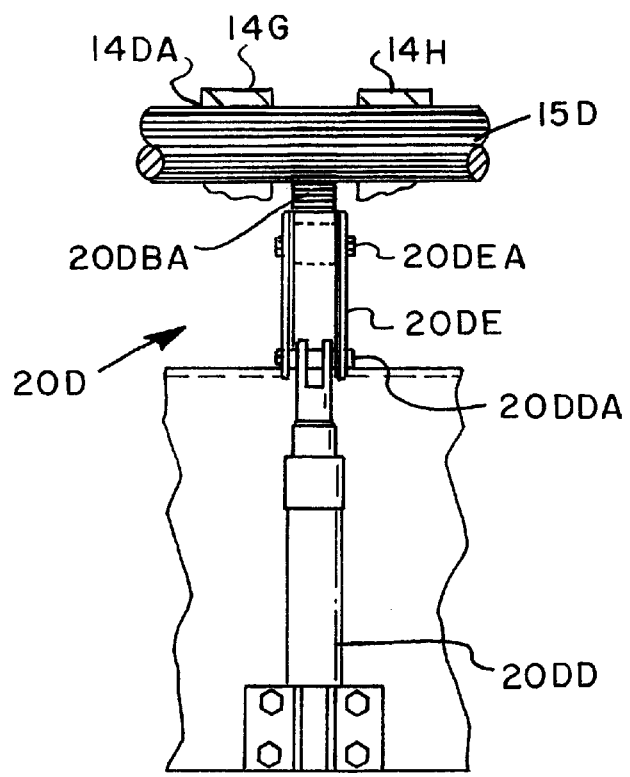
FIG. 5 is a view along line 5—5 of FIG. 4.

Referring to FIGS. 1 and 3, tortilla stack indexer (10) includes an exit conveyor (12) which comprises a exit conveyor motor (12A) engageably attached thereto. The tortilla stack indexer (10) further includes at least two pair of transverse conveyors (14A, 14B, 14C, 14D, 14E, 14F, 14G, 14H) in a side-by-side parallel configuration. The transverse conveyors (14A, 14B, 14C, 14D, 14E, 14F, 14G, 14H) are in a perpendicular position to the exit conveyor (12) positioned at a rear distal end adjacent thereto. The transverse conveyors (14A, 14B, 14C, 14D, 14E, 14F, 14G, 14H) are arranged in pairs, so that each adjacent two transverse conveyors are driven in tandem by a transverse conveyor roller (15A, 15B, 15C, 15D) positioned at a front end. For example, transverse conveyors (14G and 14H) are driven by transverse conveyor roller (15D), as best shown in FIG. 5.

The tortilla stack indexer (10) further includes at least two stacker conveyors (16A, 16B, 16C, 16D) positioned adjacent to the front end of the at least two pair of transverse conveyors (14A, 14B, 14C, 14D, 14E, 14F, 14G, 14H). The stacker conveyors (16A, 16B, 16C, 16D) are corotatably mounted to at least two stacker conveyor rollers (16AA, 16BA, 16CA, 16DA) at the rear thereof.

Figure 4:
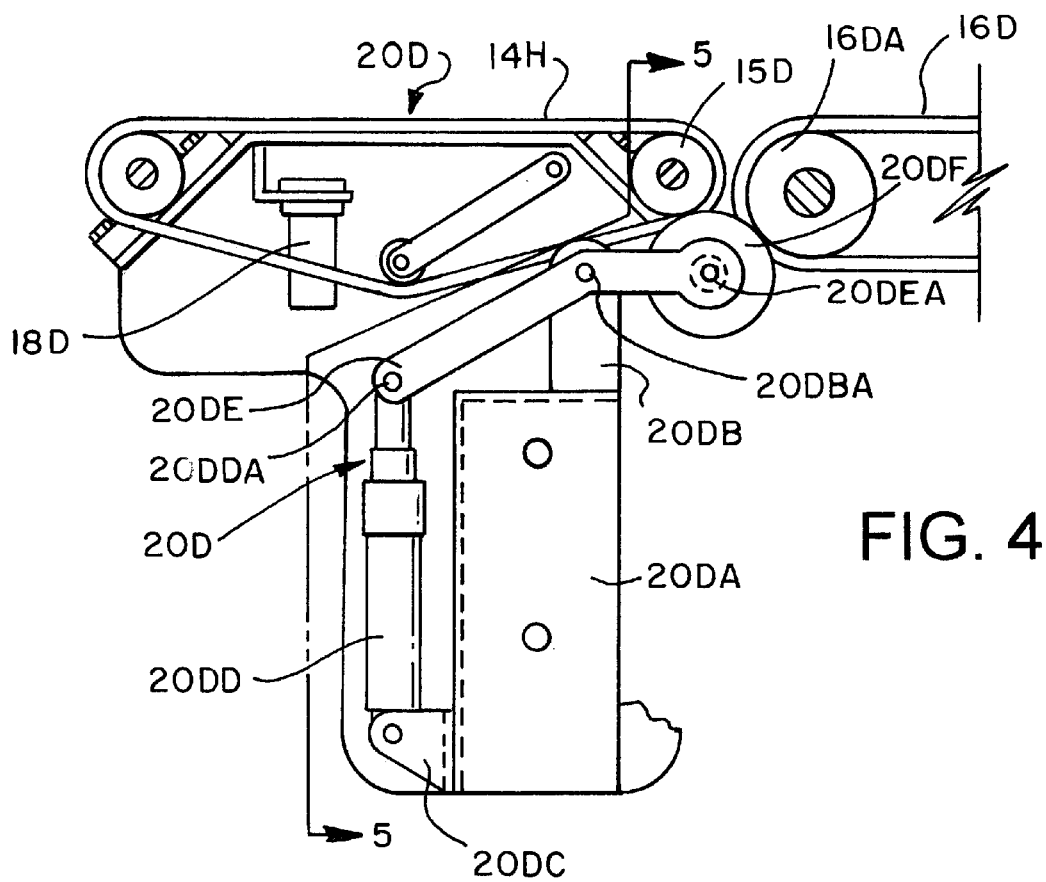
FIG. 4 is a view along line 4—4 of FIG. 1.

Referring to FIGS. 1, 2, 4 and 5, the tortilla stack indexer (10) further includes at least two drive interrupters (20A (not shown), 20B (not shown), 20C (not shown), 20D) engageably positioned between the transverse conveyor rollers (15A, 15B, 15C, 15D) and the stacker conveyor rollers (16AA, 16BA, 16CA, 16DA). Each drive interrupter (20A, 20B, 20C, 20D) includes a drive interrupter housing (20DA) having an interrupter top member (20DB) and an interrupter bottom member (20DC) extending outwardly therefrom. A drive interrupter actuator (20DD) is securely attached at a bottom end to the drive interrupter bottom member (20DC) and pivotally attached at a top end to a proximal end of a drive arm (20DE) by a drive interrupter actuator pivot pin (20DDA). The drive arm (20DE) is rotatably attached at a distal end to a drive interrupter roller (20DF) by a drive arm pivot pin (20DEA). Referring to FIG. 4, the drive arm (20DE) is pivotally attached in a middle to the drive interrupter top member (20DB) by a drive interrupter top member pivot pin (20DBA).

The tortilla stack indexer (10) further includes at least two transverse conveyor electric eyes (18A, 18B, 18C, 18D) securely mounted under the least two pair of transverse conveyors, the electric eyes (18A, 18B, 18C, 18D) operatively connected to the drive interrupters (20A, 20B, 20C, 20D). The tortilla stack indexer (10) further includes at least one exit conveyor electric eye (19A, 19B, 19C) securely mounted across from and in between the least two pair of transverse conveyors. The exit conveyor electric eyes (19A, 19B, 19C) are also operatively connected to the drive interrupters (20A, 20B, 20C, 20D).

In operation, drive interrupter roller (20DF) functions as an idler roller between transverse conveyor roller (15D) and stacker conveyor roller (16DA). Stacker conveyor roller (16DA) drives transverse conveyor roller (15D) as long as drive interrupter roller (20DF) is engaged by retraction of drive interrupter actuator (20DD). The drive arm (20DE) preferably includes a bent configuration functioning to facilitate the disengagement of the drive interrupter roller (20DF) from the transverse conveyor roller (15D) and the stacker conveyor roller (16DA) when actuator (20DD) is extended.

Figure 6A:
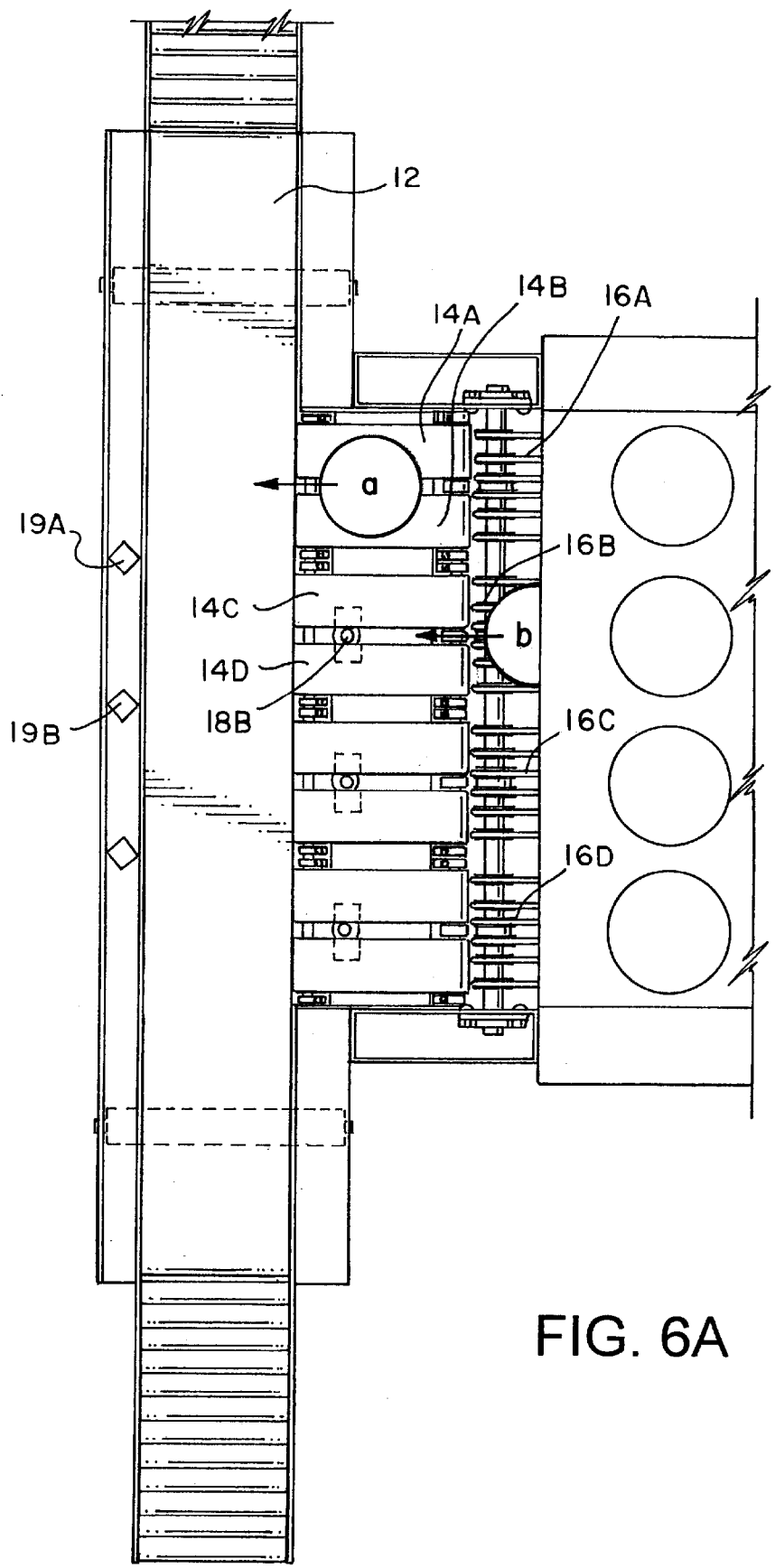
FIGS. 6A, 6B, and 6C are sequential views illustrating operation of the invention.
Figure 6B:
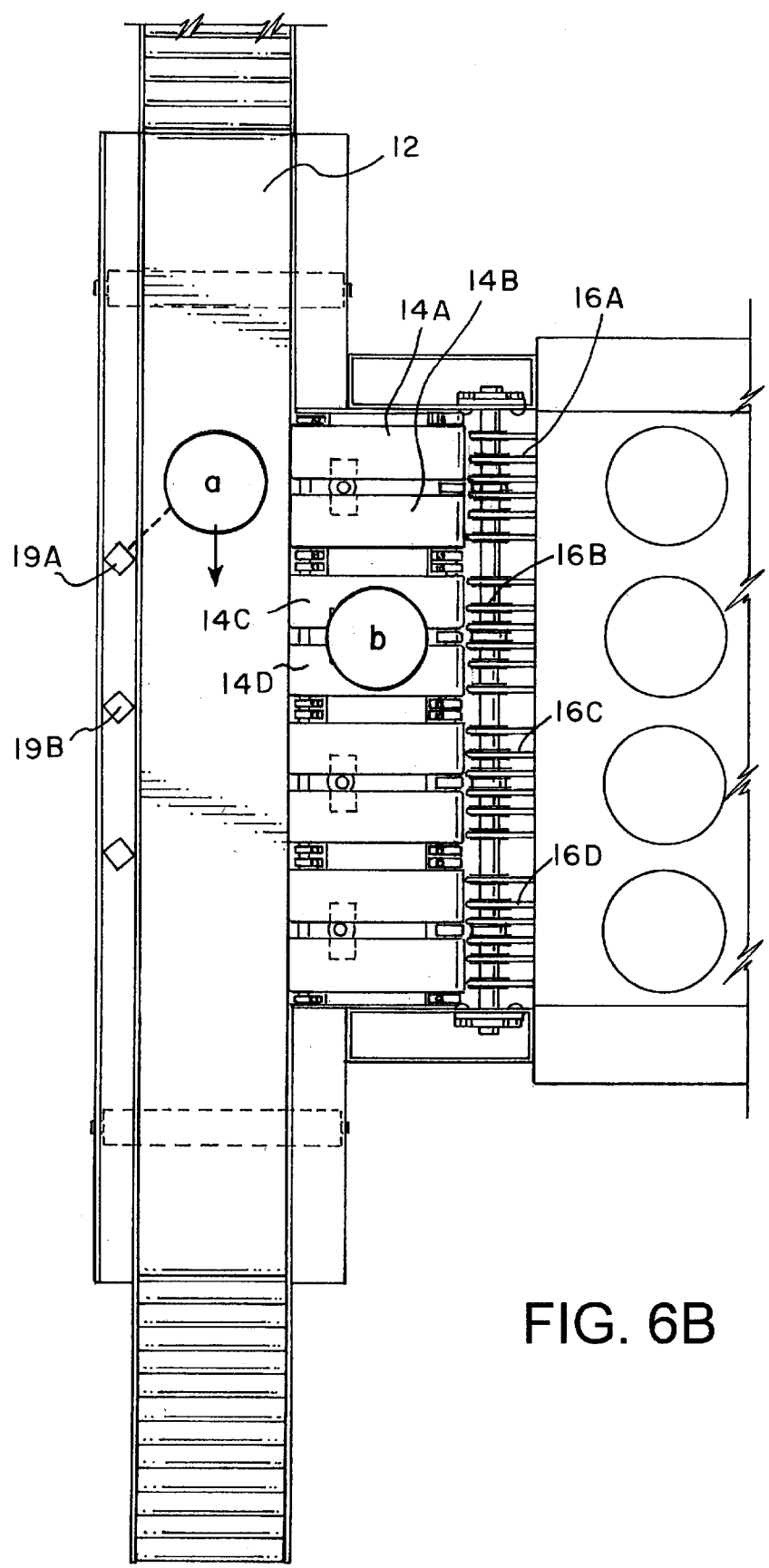
Figure 6C:
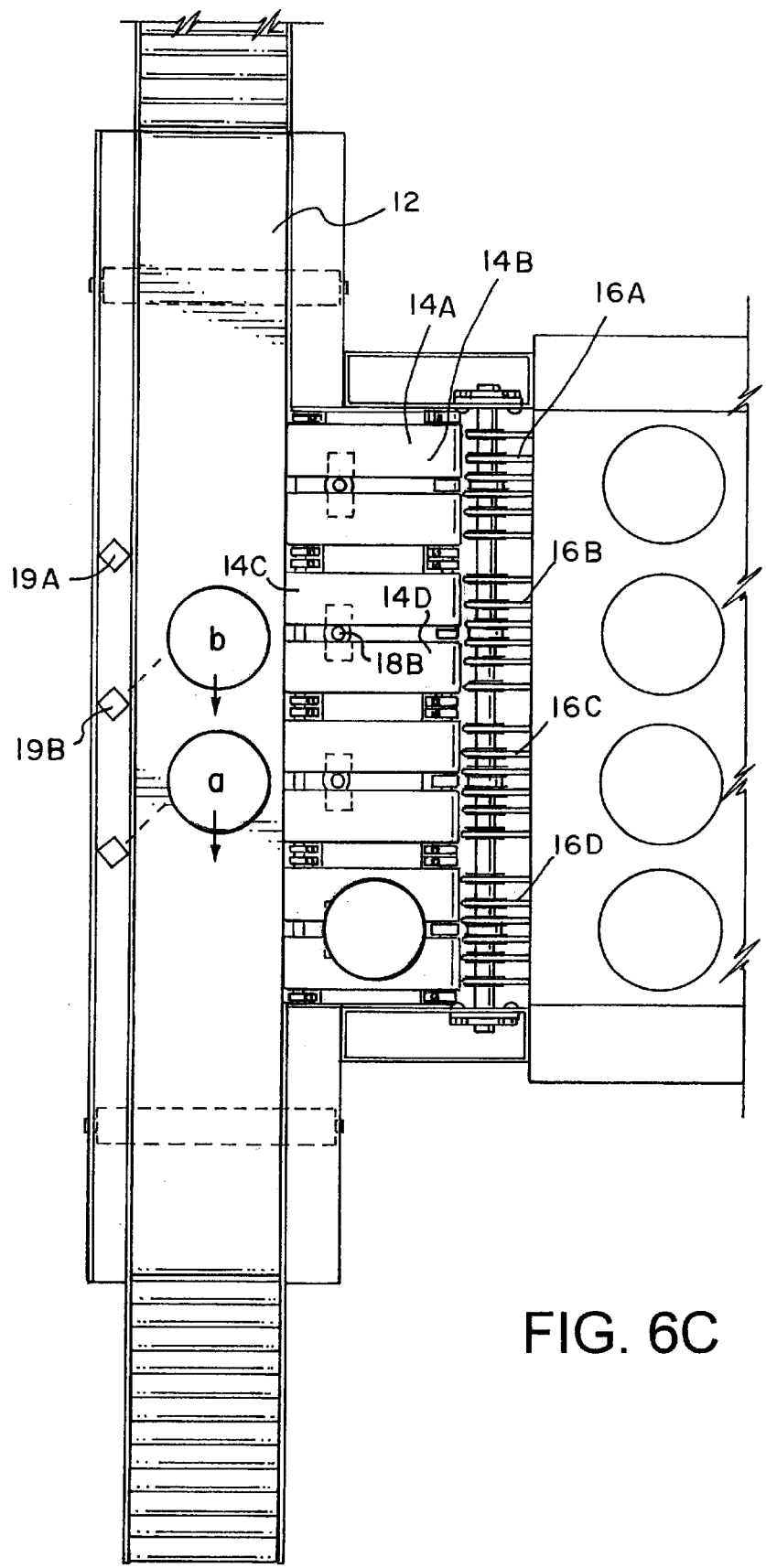

Operation is best shown in the sequential views FIGS. 6A, 6B, and 6C. It will be understood that the timing of finished stacks on stacker conveyors (16A, 16B, 16C, 16D) is unsynchronized, so that occasionally collisions on the exit conveyor may occur. For example, in FIG. 6A, the timing is such that the first stack (a) of tortillas on the first pair of transverse conveyors (14A, 14B) will collide on the exit conveyor (12) with second stack (b) of tortillas on the second pair of transverse conveyors (14C, 14D) unless stack (b) is delayed. The device is designed to sense the imminent collision and appropriately prevent the collision by interrupting one of the stacks on its transverse conveyor. Accordingly, as shown in FIG. 6B, the leading edge of stack (b) is sensed by transverse conveyor electric eye (18B), while the leading edge of stack (a) has been sensed by the exit conveyor electric eye (19A). The coincident sensing of stacks (a) and (b) by electric eyes (18B, 19A) actuates actuator (20B), thereby stopping stack (b). Once the danger of collision passes, by further movement of stack (a), actuator (20B) returns to its normally retracted position, resuming movement of stack (b) so that it falls in line behind stack (a) on the exit conveyor (12) as shown in FIG. 6C. In similar fashion, as also shown in FIG. 6C, a stack (c) is being held until both stacks (a) and (b) pass on the exit conveyor (12). In each case, the electric eyes send a signal to the drive interrupter which elongates the drive interrupter actuator, disengaging the drive interrupter roller from the transverse conveyor roller, and the transverse conveyor stops the movement of the stacks of tortillas on the pair of transverse conveyors, preventing the stacks of tortillas from colliding.

It will be understood that while the transverse conveyors (14A–H) are shown in pairs, with an electric eye (18A–D) underneath and in between each pair for convenience in manufacturing, equivalent function could be obtained with half as many full-width, non-paired transverse conveyors with an electric eye for each conveyor mounted above or to the side.

It will also be understood that electric eye (18A) is unnecessary where the exit conveyor moves in the direction illustrated. Electric eye (18A) is utilized when the exit conveyor is designed to be reversible to go in either direction. In that case suitable logic modifications within the skill of one versed in this art will also have to be made.

It will be further understood that each of the elements described above, or two or more together, may also find a useful application in other types of constructions differing from the type described above.

While the invention has been illustrated and described as embodied in a tortilla stack indexer, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A tortilla stack indexer comprising:

an exit conveyor which comprises an exit conveyor motor engageably attached thereto;

a plurality of transverse conveyors in a side-by-side parallel configuration, the transverse conveyors in a perpendicular position to the exit conveyor positioned at a rear distal end adjacent thereto;

a drive interrupter engaged with at least one transverse conveyor;

a stack position sensor operatively engaged with the drive interrupter, the stack position sensor adapted and arranged to prevent stacks of tortillas on the exit conveyor from colliding with stacks of tortillas on the at least one of the transverse conveyors;

the transverse conveyors each including a transverse conveyor roller positioned at a front end;

a stacker conveyor positioned adjacent to the front end of each transverse conveyor;

the stacker conveyor including a stacker conveyor roller positioned at a rear end, with the stacker conveyor in driving relationship to its adjacent transverse conveyor;

the drive interrupter engageably positioned between the transverse conveyor roller and the stacker conveyor roller;

the drive interrupter adapted and arranged to selectively effect the driving relationship between the transverse conveyor roller and the stacker conveyor roller; and the drive interrupter including a drive interrupter housing having an interrupter top member and an interrupter bottom member extending outwardly therefrom, a drive interrupter actuator securely attached at a bottom end to the drive interrupter bottom member and pivotally attached at a top end to a proximal end of a drive arm by a drive interrupter actuator pivot pin, the drive arm rotatably attached at a distal end to a drive interrupter roller by a drive arm pivot pin, the drive arm pivotally attached in a middle to the drive interrupter top member by a drive interrupter top member pivot pin.

2. A tortilla stack indexer comprising:

A) an exit conveyor which comprises a exit conveyor motor engageably attached thereto;

B) at least first and second pairs of transverse conveyors in a side-by-side parallel configuration, the transverse conveyors in a perpendicular position to the exit conveyor positioned at a rear distal end adjacent thereto, each of the first and second pairs of transverse conveyors including a transverse conveyor roller positioned at a front end;

C) a stacker conveyor positioned adjacent to the front end of each pair of transverse conveyors, the stacker conveyor including a stacker conveyor roller positioned at a rear end;

D) a drive interrupter engageably positioned between the transverse conveyor roller and the stacker conveyor roller, the drive interrupter including a drive interrupter housing having an interrupter top member and an interrupter bottom member extending outwardly therefrom, a drive interrupter actuator securely attached at a bottom end to the drive interrupter bottom member and pivotally attached at a top end to a proximal end of a drive arm by a drive interrupter actuator pivot pin, the drive arm rotatably attached at a distal end to a drive interrupter roller by a drive arm pivot pin, with the drive arm pivotally attached in a middle to the drive interrupter top member by a drive interrupter top member pivot pin; and E) a transverse conveyor electric eye securely mounted under and in between the second pair of transverse conveyors, an exit conveyor electric eye securely mounted adjacent the exit conveyor, the electric eyes operatively connected to the drive interrupter, such that when a first stack of tortillas is on the exit conveyor and a second stack of tortillas is on the second pair of transverse conveyors in position to collide with the first stack of tortillas, the electric eyes signal the drive interrupter to elongate the drive interrupter actuator, thereby disengaging the drive interrupter roller from the transverse conveyor roller and the stacker conveyor roller, stopping the transportation of the second stack of tortillas on the second pair of transverse conveyors and preventing the stacks of tortillas from colliding.

3. The tortilla stack indexer as described in claim 2, wherein the drive arm comprises a bent configuration functioning to facilitate the disengagement of the drive interrupter roller from the transverse conveyor roller and the stacker conveyor roller.

* * * * *